United States Patent [19]

Oyama et al.

[11] 4,342,436

[45] Aug. 3, 1982

[54] TAPE CASSETTE

[75] Inventors: Masaru Oyama; Kenji Takahashi, both of Tagajo, Japan

[73] Assignee: Sony Corporation, Tokyo, Japan

[21] Appl. No.: 160,745

[22] Filed: Jun. 18, 1980

[30] Foreign Application Priority Data

Jun. 29, 1979 [JP] Japan ............................ 54-90011[U]

[51] Int. Cl.³ .............................................. G11B 23/10
[52] U.S. Cl. ...................................... 242/199; 360/95
[58] Field of Search ............... 242/199, 198, 197, 200, 242/55.19 A; 360/95, 96.5; 352/72, 78; 226/198, 196

[56] References Cited

U.S. PATENT DOCUMENTS

| | | | |
|---|---|---|---|
| 3,797,779 | 3/1974 | Esashi et al. | 242/199 |
| 3,801,042 | 4/1974 | Dobson | 242/198 |
| 3,802,648 | 4/1974 | Kihara et al. | 242/199 |
| 3,888,429 | 6/1975 | Mack | 242/55.19 A |
| 4,074,876 | 2/1978 | Gourley | 242/199 |

Primary Examiner—Billy S. Taylor
Attorney, Agent, or Firm—Lewis H. Eslinger; Alvin Sinderbrand

[57] ABSTRACT

A tape cassette comprises magnetic tape; supply and take-up reels on which the magnetic tape is wound; a cassette housing for enclosing the supply and take up reels and including a provision for permitting the tape to be withdrawn from the cassette housing when in use; and a flexible film strip affixed to the cassette housing to prevent movement of the magnetic tape when not in use. The flexible film strip is formed of a resilient strip, for example, of polyester, in which one end thereof biases against the tape and a portion remote from the one end has an opening therethrough. The cassette housing has a projection therein for engaging the opening to mechanically affix the resilient flexible strip to the cassette housing. Another end of the resilient strip engages a run of tape at the front of the cassette housing to hold the tape at a predetermined position. Preferably, there is a layer of low friction material at each end of the flexible film strip.

15 Claims, 6 Drawing Figures

TAPE CASSETTE

BACKGROUND OF THE INVENTION

1. Field of the Invention

This invention relates to a tape cassette, and more particularly to an improvement in a tape cassette of the type in which a magnetic tape wound on and guided between supply and take-up reels is withdrawn from the front opening of the cassette housing in use, and a flexible strip affixed to the cassette housing biases against the magnetic tape to prevent it from moving when the cassette is not in use.

2. Description of the Prior Art

Conventionally, a tape cassette used in a video tape recorder (VTR) is installed into an operative position in the VTR, and the magnetic tape in the cassette housing is engaged with a loading mechanism of the VTR. The magnetic tape is withdrawn from the front opening of the cassette housing by the loading mechanism so that the tape is threaded along a predetermined path. The magnetic tape is run in the loaded condition to record signals thereon or to reproduce signals therefrom.

In the tape cassette, the ends of the magnetic tape are respectively affixed to supply and take-up reels mounted in the cassette housing. A length of the magnetic tape between those portions wound on the supply and take-up reels extends across the front opening of the cassette housing, when the tape cassette is not in use, that is before the magnetic tape is withdrawn from the front opening of the cassette housing. Since the supply and take-up reels are freely rotatable in the cassette housing, the magnetic tape is easily made loose or slack by vibration or shock during handling of the tape cassette. Such looseness and slack bring about various disadvantages, and can lead to damage of the slackened portions of the magnetic tape. Then the tape cassette with damaged tape is installed in the VTR, troubles are apt to occur in the operation of the VTR. Furthermore, the slack in the magnetic tape may lead to defective recording or reproducing operations.

Accordingly, a member for avoiding such slack or looseness of the magnetic tape when not in use is employed in a prior art cassette-type VTR or tape recorder. For example, it is disclosed in the U.S. Pat. No. 3,797,779 and No. 3,802,648 having the same assignee as this application. In the foregoing Patents, the member for avoiding the slack or looseness of the magnetic tape comprises a flexible film strip affixed at one end with adhesive to a part of the lower half of the cassette housing. The other, free end thereof has a layer of low friction material such as soft synthetic resin. The magnetic tape is pressed between the free end of the flexible film strip and another part of the lower half of the cassette housing, so that it is prevented from slackening or loosening when the tape cassette is subjected to vibration or shock.

However, since the flexible film strip is affixed to the cassette housing with adhesive, the number of steps required for assembly is rather high, and the manufacturing efficiency is low, resulting in high cost. Further, as adhesive deteriorates with age, the adhesive can eventually give way, and the flexible film strip can fall from the cassette housing. Further, the construction of a conventional cassette makes it very difficult to automatically mount the flexible film strip onto the cassette housing.

Alternatively, methods for mechanically fixing the flexible film strip to the cassette housing have been proposed. In one example, the flexible film strip is mounted on the lower half of the cassette housing, and then the upper half of the cassette housing is mated with the lower half of the cassette housing, so that a projection formed on the upper half of the cassette housing holds the flexible film strip. However, if the lower half of the cassette housing is subjected to vibration during the mating operation thereof with the upper half, or if another part, while assembled, contacts with the flexible film strip mounted on the lower half, the position of the flexible film strip can accidentally vary. Accordingly, much care should be taken in the assembling operation, with the result that the manufacturing efficiency is reduced. Also, if the upper half is mated with the lower half, when the position of the flexible film strip is deflected, the film strip can be damaged.

In some manufacturing techniques, the upper half is mated with the lower half before the magnetic tape is assembled in the tape cassette and the empty tape cassette is transported from one manufacturing facility to another for the final manufacture of the tape cassettes. In the other facility, the upper half is separated from the lower half in order to assemble the magnetic tape. In the separating operation, there is a possibility that the flexible film strip can become demounted from the lower half when with the upper half is separated.

SUMMARY OF THE INVENTION

Accordingly, it is an object of this invention to provide a tape cassette in which a flexible strip can be very easily and securely fixed to the upper or lower half of the cassette housing.

Another object of this invention is to provide a tape cassette in which the number of parts is reduced in comparison with the prior-art tape cassette.

A further object of this invention is to provide a tape cassette for which the number of assembling steps is reduced in comparison with the prior-art tape cassette.

A still further object of this invention is to provide a tape cassette in which the means of affixing of the flexible strip is not deteriorated with aging.

A yet further object of this invention is to provide a tape cassette which is reliable.

Another further object of this invention is to provide a tape cassette for which manufacturing cost is low.

Yet another further object of this invention is to provide a tape cassette which can be automatically assembled.

In accordance with an aspect of this invention, a tape cassette comprises magnetic tape; supply and take up reels on which the magnetic tape is wound; a cassette housing for enclosing said supply and take-up reels and including a provision for permitting the tape to be withdrawn from the cassette housing when not in use; and a flexible film strip affixed to the housing for biasing the tape against the housing to prevent movement of the magnetic tape when not in use. The flexible film strip includes a resilient flexible strip, for example, formed of polyester, having an end portion biasing against the tape and another portion remote from the end portion having an opening therethrough. The cassette housing includes a projection engaging such opening to mechanically affix the resilient flexible strip to the cassette housing.

In accordance with another aspect of this invention, a tape cassette comprises magnetic tape; supply and take-up reels on which the magnetic tape is wound; a cassette housing for enclosing the supply and take-up reels, including a provision for permitting the tape to be withdrawn from the cassette when in use, and having a front opening across which a run of the magnetic tape extends when the cassette is not in use; and a flexible film strip affixed to the housing for biasing the magnetic tape to impart a predetermined back tension to the magnetic tape unwound from the supply and take-up reels, and also biasing the run of magnetic tape along the front opening of the cassette housing to hold the run of tape at a predetermined position. The flexible film strip includes a resilient flexible strip having first and second end portions and an opening therein intermediate between the end portions. The cassette housing includes a projection formed integrally with the cassette housing for engaging the opening in the flexible film strip to affix the same to the cassette housing.

Various other objects, advantages, and features of the present invention will become readily apparent from the ensuing detailed description, and the novel features will be particularly pointed out in the appended claims.

DESCRIPTION OF THE PREFERRED EMBODIMENTS

First, in order to facilitate the understanding of this invention, there will be described a prior-art tape cassette with reference to FIG. 1.

Figure 1:
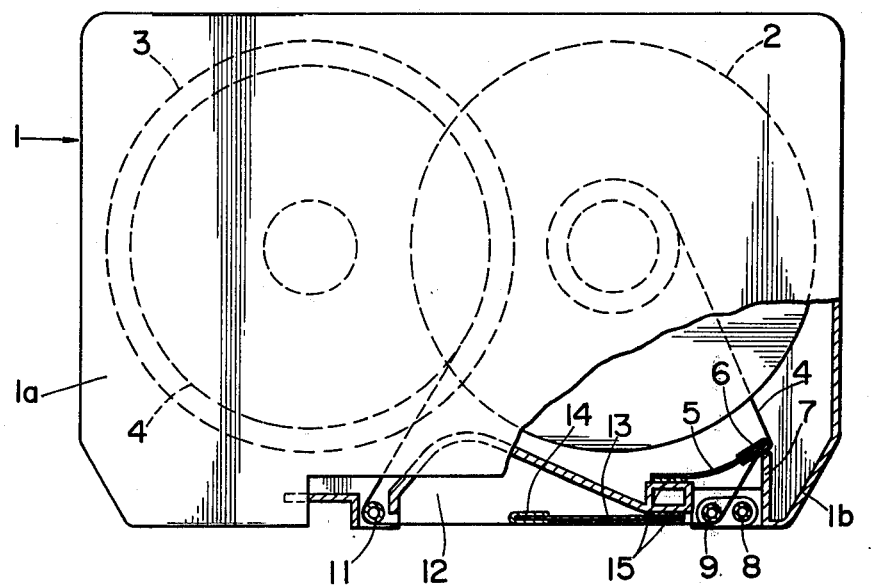
FIG. 1 is a partly-broken plan view of a prior art tape cassette for a VTR.

Referring to FIG. 1, a cassette housing 1 consists of upper and lower halves 1a and 1b. Supply and take-up reels 2 and 3, respectively, are rotatably mounted in the cassette housing 1. A magnetic tape 4 is wound on the supply and take-up reels 2 and 3, and the front and rear ends of the magnetic tape 4 are respectively affixed to the reels 2 and 3. The magnetic tape 4 unwound from the supply reel 2 passes between a layer 6 of low friction material fixed on a free end of a flexible film strip 5 formed of soft synthetic resin and a wall portion 7 of the lower half 1b and the tape 4 is pressed between layer 6 and wall portion 7. Thus, a predetermined back tension is applied to the magnetic tape 4 by the flexible film strip 5. The tape 4 then passes between guide pins 8 and 9, and across an opening 12 formed in the front side of the cassette housing 1. The tape 4 is guided by another guide pin 11 to the take-up reel 3. Although not shown, another flexible film strip is conventionally arranged between the guide pin 11 and the take-up reel 3, and the magnetic tape 4 is pressed between another wall portion of the lower half 1b and a layer of low friction material fixed on one end of such other flexible film strip.

Whenever the reels 2 and 3 are unexpectedly or inadvertently rotated by vibration and shock, the run of the tape 4 along the opening 12 is prevented from becoming loosened, and is thus maintained in a tensioned condition.

A further flexible film strip 13 is mounted at the front opening 12 of the cassette housing 1. The magnetic tape 4 is pressed between the cassette lid (not shown) and a layer 14 of low friction material fixed on a free end of the flexible film strip 13. Thus, the run of the tape 4 along the opening 12 is maintained at a predetermined position by the flexible film strip 13.

The flexible strip 5 and 13 are fixed to the lower half 1b of the cassette housing 1 with an adhesive 15. Accordingly, the number of steps required for assembling the cassette is large. As a result, the manufacturing efficiency is low, and the cost of manufacture is high. Adhesive 15 can be expected to deteriorate with aging, so that eventually the flexible film strips 5 and 13 are likely to come apart from the cassette housing 1. Furthermore, it is difficult to automatically affix the flexible films 5 and 13 to the cassette housing 1 with adhesive.

However, the above-mentioned drawbacks are overcome in a video tape cassette according to this invention, one embodiment of which is now described with reference to FIG. 2 to FIG. 6.

Figure 2:
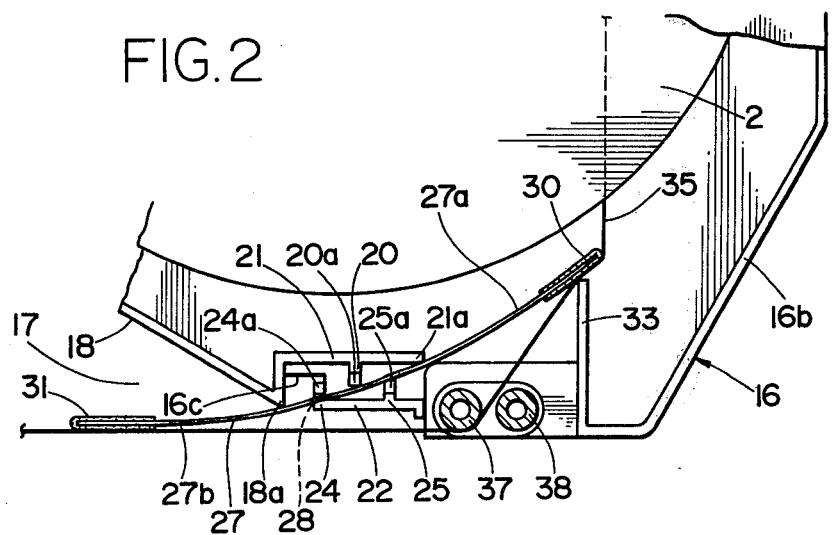
FIG. 2 is a plan view showing the pertinent parts of a tape cassette according to one embodiment of this invention in which an upper half of the cassette housing is removed.
Figure 3:
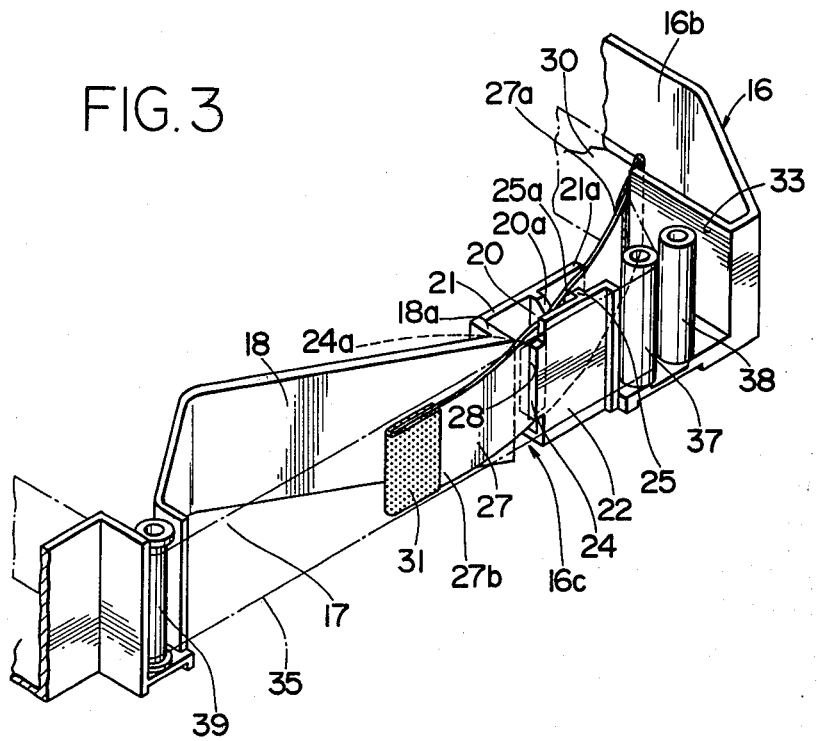
FIG. 3 is a perspective view of the important part of the tape cassette of FIG. 2.
Figure 4:
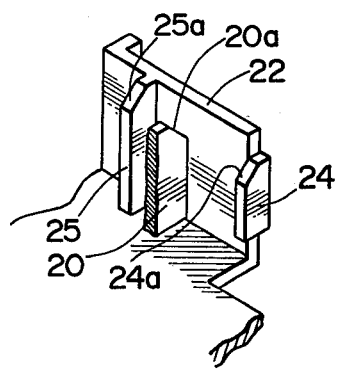
FIG. 4 is another perspective view of the pertinent parts of the tape cassette of FIG. 2.
Figure 5:
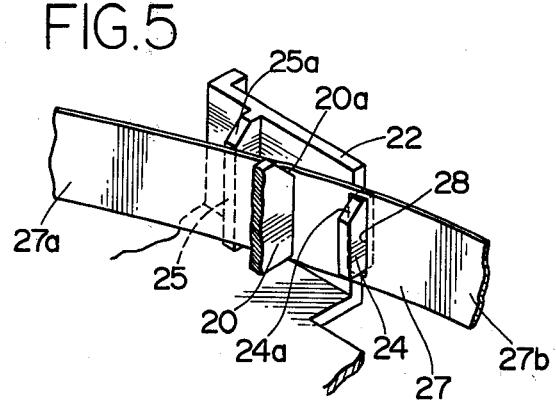
FIG. 5 is a further perspective view of the pertinent parts of the tape cassette of FIG. 2, in which a flexible film strip is engaged.

As shown in FIG. 2 to FIG. 5, a substantially V-shaped opening or recess 17 is formed in the front side of a lower half 16b of a cassette housing 16, and such recess 17 is defined by a vertical front wall portion 18 formed integrally with the lower half 16b. A film support wall portion 21 having substantially F-shaped cross section is formed integrally on the right end of the front wall portion 18 (FIG. 2 and FIG. 3) and intersects the latter at a corner 18a. A projection 20 is formed integrally with the film support wall portion 21 in the center thereof. As shown in FIG. 2, the film support wall portion 21 is parallel with the front-side edge of the cassette housing 16. Another F-shaped film support wall portion 22 is formed integrally with the lower half 16b, in a facing relationship with the one film support wall portion 21. Projections 24 and 25 are formed integrally with the other film support wall portion 22, extending towards the one film support wall portion 21. Slants or chamfers 20a, 24a, and 25a are formed on the upper edges of the projections 20, 24, and 25, respectively, as clearly shown FIG. 3 to FIG. 5. The slant 20a is inclined downwards with respect to the other film support wall portion 22, while the slants 24a and 25a are inclined downwards with respect to the one film support wall portion 21. A flexible film strip 27 can be easily deflected by means of the slants 20a, 24a, and 25a, so that the strip 27 can be mounted on the lower half 16b. A cut-out portion 16c is formed under the projection 24 in the lower half 16b. In consideration of the moldability of lower half 16b, no undercut is provided in the cut-out portion 16c.

Figure 6:
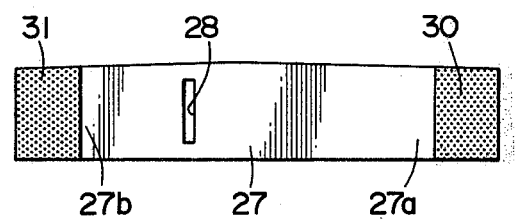
FIG. 6 is a plan view of a flexible film strip used in the tape cassette of FIG. 2.

The flexible film strip 27 is, for example, made of polyester. It is mounted on the lower half 16b such that the intermediate portion of the film strip 27 is held between the film support wall portions 21 and 22. As shown in FIG. 6, a rectangular opening 28 is formed in the film strip 27. The opening 28 extends through the thickness of the strip 27, and is elongated in the width direction thereof. Between the corner 18a of the front wall portion 18 and the projection 20 of the one film support wall portion 21, the projection 24 of the other film support wall portion 22 engages the rectangular opening 28 of the film strip 27. The corresponding cross-section of the projection 24, where it engages the opening 28, is likewise elongated in the width direction of the strip 27.

The projection 20 of the one film support wall portion 21 enters part way into the space between the projections 24 and 25 of the other film support wall portion 22, as shown in FIG. 2. Thus, the flexible film strip 27 is deflected towards the other film support wall portion 22 by the projection 20 of the one film support wall portion 21 thereby biasing the strip 27, so that the projection 24 is securely maintained in position in the rectangular opening 28 of the flexible film strip 27. The flexible film strip 27 is prevented from moving upwards, downwards, leftwards, or rightwards. Thus, the film strip 27 is securely affixed onto the lower half 16b.

When the flexible film strip 27 is mounted onto the lower half 16b, it is inserted between the film support wall portions 21 and 22 from above the lower half 16b. The lower end of the film 27 is slided downwards on the slants 20a, 24a, and 25a of projections 20, 24, and 25. The film strip 27 is elastically restored between the film support wall portions 21 and 22, and so the projection 24 of the film support wall portion 22 is fitted into the rectangular opening 28 of the film 27. The film strip 27 is sufficiently flexible so that although it is arcuately deformed by the projection 24, it is not damaged thereby.

Layers 30 and 31 of a low-frictional and antistatic material, such as synthetic resin polymer, for example, tetrafluoroethylene, sold under the trademark TEFLON, and containing particles of carbon, are fixed on each of the end portions of the flexible film strip 27. The magnetic tape 4 is biased between one such layer 30 and a wall portion 33 formed integrally with the lower half 16b. The respective end portion 27a of the film strip 27 on which layer 30 is fixed, is curved elastically between an end 21a of the film support wall portion 21 and the wall portion 33 as shown in FIG. 2 so that a predetermined back tension is applied to a magnetic tape 35. Thus, magnetic tape 35 is prevented from loosening or slacking.

The layer 31 on the other end portion 27b of the film strip 27 contacts with the inner surface of the run of the magnetic tape 35 along the front opening 17. The tape 35 is softy pressed against a not-shown lid rotatably mounted on the cassette housing 16b when the lid is in a closed position. This end portion 27b of the film strip 27 is deformed elastically between the corner 18a of the front wall portion 18, and the point of contact of the tape 35 and layer 31. Thus, the tape 35 is maintained in a spaced relationship with respect to the front wall portion 18. When the cassette housing 16 is installed in the VTR, a withdrawing pin of the tape loading device can be safely inserted inside of the run of magnetic tape 35 running along the front opening of the cassette housing 16, that is, between the front wall portion 18 and the tape 35. The magnetic tape 35 is so guided by guide pins 37, 38, and 39 that the magnetic tape 35 runs along the front side of the cassette housing 16.

In the above-described tape cassette, the portion of the film strip 27 that imparts the predetermined back tension to the magnetic tape 35 to prevent the front run of the magnetic tape 35 from slackening is integrally formed with the portion of the film strip 27 which softly presses the front run of magnetic tape 35 to hold it in its predetermined path. Accordingly, the numbers of required parts and assembly steps are reduced. Since the flexible film strip 27 can be affixed merely by the engagement of opening 28 and projection 24, it is possible to automatically assemble the tape cassette. The mechanical, glueless attachment of the flexible film strip 27 deteriorates little, if at all, with aging. Further, since the flexible film strip 27 can be affixed by attaching it only to the lower half 16b, the above-mentioned difficulties that encounter prior-art cassettes, in the case that the tape cassette is transported from one place to another place without magnetic tape and the upper half is separated from the lower half to assemble the magnetic tape, are avoided.

In the prior-art tape cassette, the free end portion of the flexible film strip 13 is deformed in an inverted V-shape, although not shown in FIG. 1, so that the free end portion of the flexible film 13 pushes the front run of the tape 4. Accordingly, the flexible film 13 has tendency to creeping. By way of contrast to this, the flexible film strip 27 of this invention is initially straight, and it is gently curved by the corner 18a of the front wall portion 18 formed in the lower half 16b. Accordingly, the amount of creeping is minimized.

While a preferred embodiment has been described, many possible modifications and variations thereto will be apparent to those skilled in the art within the scope of the present invention, which is to be delineated by the following claims.

What is claimed is:

1. A tape cassette comprising:
   a magnetic tape;
   supply and take-up means on which said magnetic tape is wound;
   cassette housing means for enclosing said supply and take-up means and including means for permitting said tape to be withdrawn from said cassette housing means when in use; and
   flexible strip means affixed to said housing means for biasing said tape against said housing means to prevent movement of said magnetic tape when not in use;
   wherein said flexible strip means includes a generally flattened resilient flexible strip having a thickness, a length, and a width, and having an end portion biasing against said tape and an opening through the thickness of said strip, and said cassette housing means includes a projection extending generally in the direction of said thickness penetrating and thus engaging said opening and at least one further projection extending in a direction generally opposite the first-mentioned direction to resiliently bias said strip over the first-mentioned projection thereby to affix said resilient flexible strip to said cassette housing means.

2. A tape cassette according to claim 1, in which said first-mentioned projection is chamfered on an upper surface thereof so that the strip can be inserted in the width direction thereof in place to be engaged by said first-mentioned projection.

3. A tape cassette according to claim 1, in which said resilient flexible strip includes soft synthetic resin.

4. A tape cassette according to claim 1, in which said flexible strip means includes a layer of low-friction material on said end portion of the resilient flexible strip.

5. A tape cassette according to claim 4, in which said layer of low-friction material consists essentially of a mixture of a synthetic resin polymer and carbon.

6. A tape cassette comprising:
   magnetic tape;

supply and take-up means on which said magnetic tape is wound;

cassette housing means for enclosing said supply and take-up means, including means for premitting said tape to be withdrawn from said cassette housing means when said cassette in in use, and having a front opening across which a run of said tape extends when said cassette is not in use; and flexible strip means affixed to said housing means for biasing said magnetic tape to impart a predetermined back tension to the magnetic tape unwound from said supply and take-up means, and also biasing said run of magnetic tape along the front opening of said cassette housing means to hold said run of magnetic tape at a predetermined position;

wherein said flexible strip means includes a resilient flexible strip having a thickness, a length, and a width, and having first and second end portions and an opening therein through the thickness of said strip intermediate between said end portions, and said cassette housing means includes a projection formed integrally with said housing means and extending generally in the direction of said thickness for penetrating and engaging said opening, and at least one further projection formed integrally with said cassette housing means extending in a direction generally opposite the first-mentioned direction to resiliently bias said strip over the first-mentioned projection thereby to affix said resilient flexible strip to said cassette housing means.

7. A tape cassette according to claim 6, in which said first-mentioned projection is chamfered on an upper surface thereof so that the strip can be inserted in place in the width direction thereof engaging said first-mentioned projection.

8. A tape cassette according to claim 6, in which said resilient flexible strip includes soft synthetic resin.

9. A tape cassette according to claim 6, in which said flexible strip means includes a layer of low-friction material at each of said first and second end portions of said resilient flexible strip.

10. A tape cassette according to claim 9, in which said low-friction material consists essentially of a mixture of a synthetic resin polymer and carbon.

11. A tape cassette according to claim 2, in which said at least one further projection is correspondingly chamfered on an upper surface thereof.

12. A tape cassette according to claim 7, in which each said further projection is correspondingly chamfered on an upper surface thereof.

13. A tape cassette according to claim 6, in which said cassette housing means includes an upper housing half and a lower housing half assembled together with the supply and take-up means disposed therewithin, and said first mentioned and said further projections are integrally formed on the same one of said upper and lower cassette halves.

14. A tape cassette according to claim 6, wherein said first end portion of said strip is disposed so as to impart said back tension and said second end portion thereof is disposed so as to hold said run of tape at said predetermined position.

15. A tape cassette according to claim 6, wherein said opening and is elongated in the width direction of said strip, and said first-mentioned projection has a cross-section, corresponding to said opening, that is likewise elongated.

* * * * *